Figure 5:
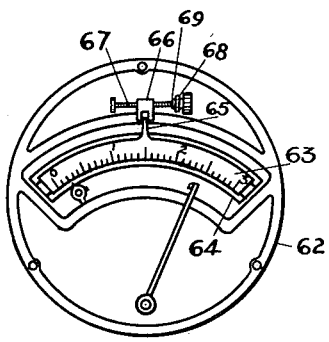

Sept. 4, 1923.
P. R. BASSETT
1,467,084
METHOD OF INDICATING THE PRESENCE AND PERCENTAGE OF HYDROGEN
Filed March 16, 1917     2 Sheets-Sheet 1
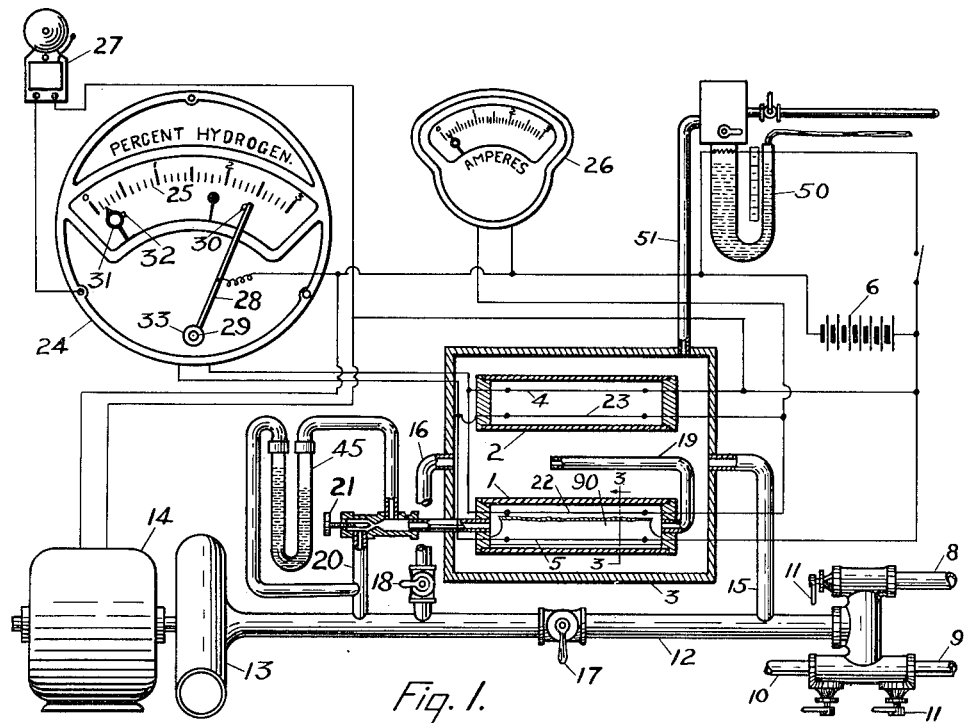
Fig. 1.
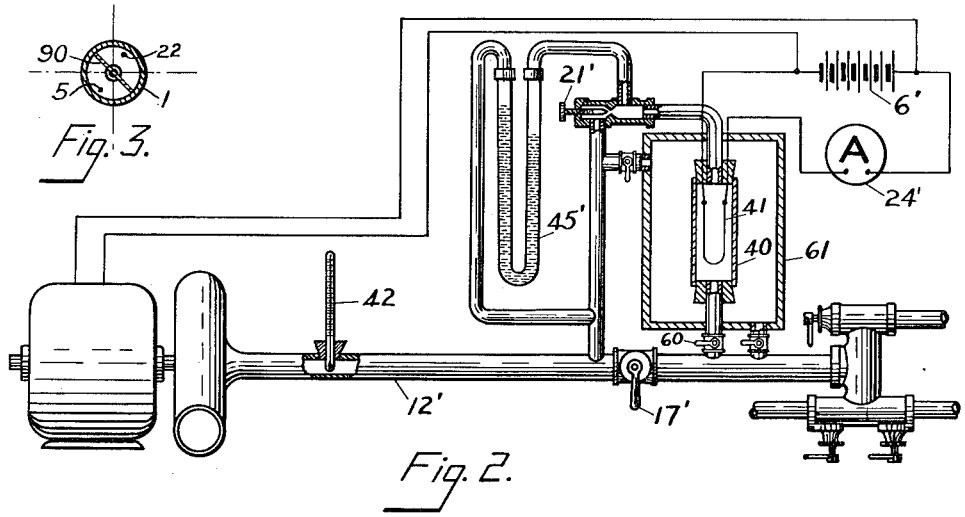
Fig. 3.
Fig. 2.
INVENTOR
PRESTON R. BASSETT.
BY
Herbert H. Thompson
ATTORNEY Sept. 4, 1923.

P. R. BASSETT 1,467,084

METHOD OF INDICATING THE PRESENCE AND PERCENTAGE OF HYDROGEN

Filed March 16, 1917    2 Sheets-Sheet 2

INVENTOR
PRESTON R BASSETT.
BY
Herbert H. Thompson,
ATTORNEY

Patented Sept. 4, 1923.

1,467,084

UNITED STATES PATENT OFFICE.

PRESTON R. BASSETT, OF BROOKLYN, NEW YORK, ASSIGNOR TO ELMER A. SPERRY, OF BROOKLYN, NEW YORK.

METHOD OF INDICATING THE PRESENCE AND PERCENTAGE OF HYDROGEN.

Application filed March 16, 1917. Serial No. 155,375.

*To all whom it may concern:*

Be it known that I, PRESTON R. BASSETT, a citizen of the United States, residing at 1716 Newkirk Avenue, Brooklyn, in the county of Kings and State of New York, have invented certain new and useful Improvements in Methods of Indicating the Presence and Percentage of Hydrogen, of which the following is a specification.

This invention relates to method of detecting the presence of explosive mixtures in air, and has for its purpose the perfection of a system whereby an accurate percentage of such mixtures may be ascertained at any time without the necessity of making the usual chemical tests, and whereby an alarm may be automatically given when the percentage of such gases tends to approach a dangerous point.

An accurate method of detecting explosive mixtures in the air has long been sought, and the recent development of submarine vessels, wherein storage batteries which generate hydrogen are employed, has greatly augmented the need.

Existing methods of determining the hydrogen content of air, comprise the usual chemical analysis, as well as electrical measuring instruments which employ a catalytic agent which becomes heated in absorbing hydrogen or other combustible gases, the temperature rise being measured electrically. In my invention, I make use of an entirely different principle. I employ the great difference in the heat abstracting properties between hydrogen and air, due to the great difference in their heat conductivity and in part to their specific heat. The ratio of conductivities of the two gases is about 13 in the case of hydrogen to 2 in the case of air, while in specific heat the difference is even more marked, being about 15 to 1. The capacity of hydrogen to extract heat from a hot body is therefore very great as compared with air. An electrical conductor the resistance of which varies sufficiently with varying temperatures is supplied with a current adapted to maintain it at a temperature above that of the air to be tested, with which it is in direct contact. The more hydrogen there is present, the faster heat will be abstracted from the conductor, and the more heat there is abstracted the lower the temperature of the conductor will fall, thus varying the resistance of the conductor. Any kind of electrical measuring instrument may be used for indicating this variation in resistance. It will readily be seen that with such an arrangement having a measuring instrument calibrated in terms of hydrogen percentage or the like, an excellent means is furnished for indicating the percentage or amount of hydrogen present.

Figure 6:
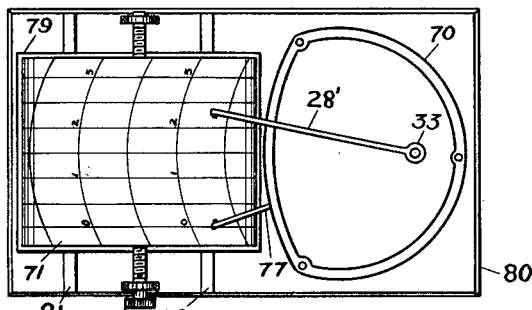
Figure 7:
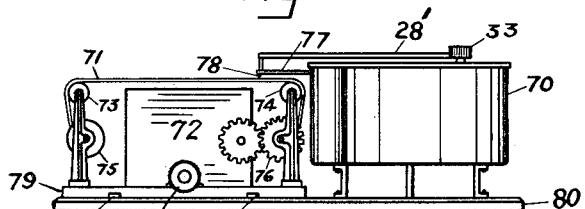
Figure 4:
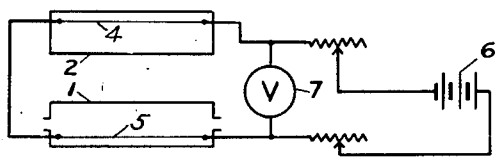

Referring to the drawings in which what I consider to be the preferred forms of my invention are shown:—Fig. 1 is an elevation, partly in section, of one form of my invention; Fig. 2 is an elevation of a modification; Fig. 3 is a detail taken on line 3—3 in Fig. 1; Fig. 4 is a modification in the wiring diagram of the instrument shown in Fig. 1; Fig. 5 is a form of reading instrument which I may use in connection with the form of instrument shown in Fig. 2; and Figs. 6 and 7 are top and side elevations of a form of instrument which may be used for making graphic records of the readings.

The apparatus shown in Fig. 1 is designed especially for use in detecting hydrogen in submarines. Pipes 8, 9 and 10 with shut off valves 11 therefor, may be provided to draw air from any desired part of the submarine for determining its hydrogen content. One of the pipes may be connected to a storage battery. The air may be drawn through the pipes into a common pipe 12 by an exhaust fan 13 driven by an electric motor 14. A common container 3 is connected to pipe 12 by tubing 15 and 16 so that the air may be circulated through said container. Valves 17 and 18 may serve to regulate the flow of air through this container. Within container 3 are two receptacles 1 and 2. Receptacle 2 is preferably sealed so that the gases within it never change. It may contain any predetermined gas, preferably pure air. Receptacle 1 on the other hand is so constructed that the air in the container 3, which is the air to be tested, may be drawn through the receptacle by means of tubing 19 and tubing 20 which is connected with pipe 12. The flow of air through the receptacle may be regulated by means of a valve 21. A manometer 45 is shown to furnish an indication of the velocity of the flow.

It will be seen that by placing the two receptacles in the common container 3 and surrounding them with the air which is to be tested, the gas within receptacle 2 may be maintained at the same temperature as the air which passes through container 1. This will prevent a difference of temperatures in the conductors hereinafter described, in the separate containers, from being produced by surrounding temperatures.

Passing through receptacles 1 and 2 are conductors 5 and 4 having a well defined temperature resistance coefficient. I have found tungsten well suited for this purpose as it is sufficiently chemically inert toward either air or hydrogen at the temperature employed, and possesses no catalytic properties toward hydrogen. Preferably wires 4 and 5 are composed of the same material and possess similar electrical properties. The two conductors may be connected in series with the electrical supply 6 as shown in Fig. 4, having a milli-voltmeter 7 shunted across them for indicating changes in resistance.

I prefer to use a plurality of wires in each unit, however, as shown in Fig. 1, by adding one or more conductors 22 and 23 in receptacles 1 and 2. By this means a greater deflection of the reading instrument is secured. The two conductors in each receptacle should not be placed so that one is directly over the other, but should be placed out of vertical alignment as shown in Fig. 3 in order to prevent ascending currents of heated air from one conductor affecting the other. I prefer, however, to insert a deflecting wall 90 between the wires to prevent the heated air from one wire reaching the other. The wires are preferably connected in such a manner as to form a Wheatstone bridge. The indicating instrument may be graduated to indicate percentage of hydrogen as shown at 25.

In operation, the two conductors 5 and 22 and preferably all of the conductors are heated to as high a point as is possible without oxidizing the wire. This point is considerably below red heat. If hydrogen is present in the air passing through receptacle 1, it will abstract heat from the wires in direct proportion to the quantity of hydrogen present. The difference in temperature between wires 5 and 4 and between wires 23 and 22 will cause a corresponding deflection of the indicating instrument. The electric circuit, it will be seen, performs two entirely distinct functions, first it heats the wires to a temperature above that of the air, and then it measures the change in resistance due to lowering of the temperature caused by the hydrogen.

Any suitable means may be provided for giving a warning when the percentage of hydrogen approaches a dangerous point. Numerous ways of accomplishing this will suggest themselves, such for instance as a white light which will burn under normal conditions, and go out when the danger point is reached. A red light may be caused to light when the danger point is reached. I prefer, however, to use a gong as shown at 27, which may be controlled by the indicating instrument. An arm 28 is shown pivoted at 29 on the indicating instrument, being insulated therefrom. A contact point 30 is provided on the end of arm 28, reaching down into the path of the indicating needle 31. A corresponding contact point 32 is provided on needle 31. When the percentage of hydrogen reaches a predetermined value points 30—32 will close the circuit through the gong and the alarm will sound. By rotating knob 33, arm 28 may be set for actuating the alarm at any desired point.

An ammeter 26 may be placed in series with the Wheatstone bridge to indicate the current at which the instrument is working. If it is desired to make occasional tests to ascertain whether the instrument is in proper working order such tests may be made by some other instrument, and the reading of the two instruments compared. For this purpose, I may employ a Burrell instrument such as is shown in U. S. Patent No. 1,176,199 to G. A. Burrell. I have shown this instrument connected by tubing 51 to container 3 of my instrument for drawing a sample of air therefrom. The manner in which the Burrell instrument may be used is described in the aforesaid patent to Burrell.

Fig. 2 illustrates one of the modifications which my invention may assume. But one receptacle 40 need be employed, in which is placed a tungsten wire 41. The air which is to be tested may be circulated through this receptacle by manipulating valves 17', 60 and 21'. A manometer 45' may serve to indicate the flow of air through the receptacle. A constant potential battery 6' is connected to the wire through a closed circuit in which a delicate ammeter 24' may be placed. It will readily be seen that any change in the temperature of wire or filament 41 will be shown on the ammeter. Where this arrangement is used, it is important that the temperature of the air under observation be known, as the change in the temperature of wire 41 caused by the cool air coming into contact therewith must be subtracted from the total change of temperature of said wire as shown by the ammeter in order to ascertain the change caused by the presence of hydrogen, and thereby ascertain the quantity or percentage of hydrogen present. To ascertain the temperature of the air under observation, therefor, I may insert a thermometer 42 in pipe 12'.

The use of the thermometer, however, necessitates mathematical computations whenever a reading is taken, or, a more or less cumbersome chart may be used. In order, therefore, to avoid this, and to obtain direct readings, I prefer to encase receptacle 40 in a container 61 and to use a reading instrument having an adjustable scale, such as is shown at 62 in Fig. 5. In this form the thermometer may be omitted. To operate the instrument now, the air is first circulated through container 61; receptacle 40 being kept closed. The temperature of the air in 40 will soon become equal to that of the air in 61. Any change in the reading now is due to the temperature of the air to be tested. The scale 63 on the indicating instrument 62 may now be shifted so that the needle will register zero. Valves 60 and 21' may now be opened and the air circulated through 40. Any reading now will be due entirely to the effect of hydrogen in the air surrounding filament 41, and such reading will indicate directly the percentage of said hydrogen.

Any suitable means may be employed for adjusting the scale 63. For this purpose I have shown the scale member slidably mounted in a guideway 64. A projection 65 on the scale member rests between projections on block 66. A screw 67 passing through block 66 and resting in guides 68 may serve to move the block laterally and thus adjust the scale. Flanges 69 on the screw prevent lateral movement through guides 68.

I desire to adapt my invention for use in hydrogen gas generating plants, so that a constant indication may be had of the degree of purity of the gas being generated. All that is necessary to accomplish this, is to calibrate the reading instrument in terms of 100% and downward. When the gas being generated is pure, the needle will indicate 100%. But when any other gases are leaking in, the conductivity of the gas in the instrument becomes reduced and the reading will be less than 100%. An alarm similar to that shown in Fig. 1 may be adjusted to attract attention whenever the purity of the gas drops below a predetermined point.

When operating under conditions where it is desired to obtain a graphic record of the condition of the air throughout a given period of time, or when using the instrument in gas plants, where it is desired to keep a graphic record of the quality of gas being produced, any of the well known methods of producing graphic records by delicate reading instruments may be employed, such for instance as meters having a revolving card attached thereto. I have shown in Figs. 6 and 7 (Fig. 6 being a top elevation and Fig. 7 a side elevation), an instrument especially suitable for this purpose wherein 70 is an electrical measuring instrument, 71 is a paper upon which the record is traced and 72 is a clockwork for causing the paper to travel over rollers 73 and 74 from reel 75 to reel 76. The indicating needle 77 may be provided with any suitable point 78 for tracing a line. An adjustable arm 28' may be provided as in Fig. 1 in connection with the alarm system. In order to adjust the scale for use in connection with the form of the invention shown in Fig. 2, I have shown the clockwork and recording paper mounted on a sub-base 79 which is in turn slidably mounted over guides 81 and 82 on base 80. The adjustments may be made by turning knob 83.

In accordance with the provisions of the patent statutes, I have hereindescribed the principle of operation of my invention, together with the apparatus, which I now consider to represent the best embodiment thereof, but I desire to have it understood that the apparatus shown is only illustrative and that the invention can be carried out by other means. Also while it is designed to use the various features and elements in the combination and relations described, some of these may be altered and others omitted without interfering with the more general results outlined, and the invention extends to such use.

Having described my invention, what I claim and desire to secure by Letters Patent is:

1. The method of measuring the hydrogen content of air which comprises passing a current of air over an electrical conductor having an appreciable temperature resistance coefficient and ascertaining a function of the change in the resistance of the conductor caused by the differences in heat conductivity of air and hydrogen.

2. The method of determining the hydrogen content of air or other gas which consists in passing a current of the air to be tested over an electrical conductor forming a leg of a Wheatstone bridge, in surrounding the conductor forming the opposite leg of said bridge with gas of known characteristics, and ascertaining a function of the difference in potential across the bridge, caused by the difference in heat conductivity of said gas and hydrogen.

3. The method of determining the hydrogen content of air or other gas which consists in passing a current of the air to be tested over an electrical conductor forming a leg of a Wheatstone bridge, in surrounding the conductor forming the opposite leg of said bridge with gas of known characteristics, and ascertaining a function of the difference in potential across the bridge, caused by the difference in heat conductivity of air and hydrogen.

4. An apparatus for measuring the hydrogen content of air comprising a plurality of electrical conductors exposed to the air which is to be tested, a plurality of electrical conductors confined within a gas of known properties, means for equalizing the temperature of said gas and said air, a source of electrical supply connected with said conductors, whereby the conductors are supplied with heat at a predetermined rate, an electrically controlled measuring instrument responsive to the difference in resistance between each set of conductors due to the presence of hydrogen for indicating the percentage of hydrogen present, and means connected with said instrument for causing an alarm when the percentage of hydrogen attains a predetermined value.

5. An apparatus for measuring the hydrogen content of air, comprising a container, a receptacle within said container, an electrical conductor within said receptacle, an electrical supply source connected with said conductor, said conductor being supplied with heat at a predetermined rate, an electrically controlled measuring instrument in circuit with said conductor, means for adjusting the scale of said instrument with respect to the needle thereof, means for admitting the air which is to be tested into said container whereby the air within said receptacle attains the temperature of the air within said container, and means for admitting the air which is to be tested into said receptacle, whereby hydrogen in said air will affect the indications of said instrument.

6. An apparatus for measuring the hydrogen content of air, comprising a container, a receptacle within said container, an electrical conductor within said receptacle, an electrical supply source connected with said conductor, said conductor being supplied with heat at a predetermined rate, an electrically controlled measuring instrument in circuit with said conductor, means for adjusting the scale of said instrument with respect to the needle thereof, means for admitting the air which is to be tested into said container whereby the air in said receptacle attains the temperature of the air within said container, means for admitting the air which is to be tested into said receptacle, whereby hydrogen in said air will affect the indications of said instrument, and means connected with said instrument for causing an alarm when the hydrogen percentage attains a predetermined value.

7. An apparatus for measuring the hydrogen content of air comprising an electrical conductor exposed to the air which is to be tested, a second conductor confined within a gas of known properties, means for equalizing the temperature of said gas and said air, a source of electrical supply connected with said conductors, the conductors being supplied with heat at a predetermined rate, an electrically controlled measuring instrument in circuit with said conductors, responsive to the various differences in resistance between said conductors for indicating the percentage of hydrogen in said air, and means connected with said instrument for making a graphic record of said percentage of hydrogen.

8. In an apparatus for determining the percentage of hydrogen in a volume of gas, an electrical conductor exposed to said gas, a second conductor confined within a gas of known properties, means for equalizing the temperature of the gas surrounding each of said conductors, a source of electrical supply connected with said conductors, the conductors being supplied with heat at a predetermined rate, and an electrically controlled measuring instrument responsive to difference in resistance between said conductors for indicating the percentage of hydrogen contained within said volume of gas.

9. The method of determining the hydrogen content of air which includes supplying a body exposed to the air to be tested with heat, supplying another body shielded from said air with heat and in comparing the rates of heat dissipation in the two instances.

10. The method of determining the hydrogen content of air which includes supplying a body exposed to the air to be tested with heat at a predetermined rate, supplying another body shielded from said air, with heat at a rate bearing a definite relation to the aforesaid heat, and ascertaining a function of the difference in the heat losses in the two instances.

11. The method of ascertaining the hydrogen content of air which comprises supplying a pair of electrical conductors subjected to equal surrounding temperatures with heat at a predetermined rate, subjecting one of said conductors to contact with the air to be tested at said temperature while the other conductor is shielded from said air and utilizing the difference in electrical resistances of said conductors for indicating said hydrogen content.

12. The method of ascertaining the hydrogen content of a gaseous mixture which comprises passing an electrical current through a pair of non-catalytic conductors, subjecting one of said conductors to contact with said mixture, subjecting the other of said conductors to a gas of known properties at the same temperature as that of the mixture under test and measuring the difference in resistance of said conductors with an instrument adapted to indicate said content.

In testimony whereof I have affixed my signature.

PRESTON R. BASSETT.